(12) United States Patent
Madisetti et al.

(10) Patent No.: US 12,493,669 B2
(45) Date of Patent: *Dec. 9, 2025

(54) METHOD AND SYSTEM FOR SECURING SCADA AND INDUSTRIAL CONTROL SOFTWARE THROUGH SECURE-WRITE OPERATIONS

(71) Applicant: Vijay Madisetti, Alpharetta, GA (US)

(72) Inventors: Vijay Madisetti, Alpharetta, GA (US); Arshdeep Bahga, Chandigarh (IN)

(73) Assignee: Vijay Madisetti, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/040,357

(22) Filed: Jan. 29, 2025

(65) Prior Publication Data

US 2025/0173407 A1 May 29, 2025

Related U.S. Application Data

(63) Continuation of application No. 18/755,251, filed on Jun. 26, 2024.

(60) Provisional application No. 63/523,362, filed on Jun. 26, 2023.

(51) Int. Cl.
*G06F 21/12* (2013.01)
*G05B 19/05* (2006.01)
*G06F 21/64* (2013.01)

(52) U.S. Cl.
CPC ........ *G06F 21/125* (2013.01); *G05B 19/058* (2013.01); *G06F 21/64* (2013.01)

(58) Field of Classification Search
None
See application file for complete search history.

(56) References Cited

U.S. PATENT DOCUMENTS 9,767,318 B1 * 9/2017 Dropps ............... G06F 21/72

\* cited by examiner

*Primary Examiner* — Brandon Hoffman
(74) *Attorney, Agent, or Firm* — Daniel C. Pierron; Widerman Malek, PL (57) ABSTRACT

A method of performing secure write operations including receiving a secure write instruction at a programmable-logic controller (PLC), performing a validation operation on the secure write instruction at the PLC, rejecting the secure write instruction responsive to determining the secure write instruction is invalid, and responsive to determining the secure write instruction is valid, verifying a permissibility of the secure write instruction at the PLC by comparing one or more parameters of the secure write instruction to a range of permitted values stored in the PLC, rejecting the secure write instruction responsive to determining the secure write instruction is impermissible, and executing the secure write instruction at the PLC responsive to determining the secure write instruction is permissible.

18 Claims, 4 Drawing Sheets

METHOD AND SYSTEM FOR SECURING SCADA AND INDUSTRIAL CONTROL SOFTWARE THROUGH SECURE-WRITE OPERATIONS

RELATED APPLICATIONS

This application is a continuation application of and claims priority under 35 U.S.C. § 120 of U.S. patent application Ser. No. 18/755,251 filed on Jun. 26, 2024 and titled METHOD AND SYSTEM FOR SECURING SCADA AND INDUSTRIAL CONTROL SOFTWARE THROUGH SECURE-WRITE OPERATIONS, which in turn claims priority under 35 U.S.C. § 119(e) of U.S. Provisional Patent Application Ser. No. 63/523,362 filed on Jun. 26, 2023 and titled Secure Write Operations for SCADA Control of PLC. The contents of these applications are incorporated herein by reference.

FIELD OF THE INVENTION

The present invention relates generally to the field of industrial control systems and, more particularly, to a method and system for enhancing the security of Supervisory Control and Data Acquisition (SCADA) systems and Programmable Logic Controllers (PLCs) through the implementation of secure-write operations.

BACKGROUND

Industrial Control Systems (ICS) play a role in managing and controlling critical infrastructure and industrial processes across various sectors, including manufacturing, energy production, water treatment, and transportation. At the heart of these systems lie two components: SCADA systems and PLCs. Understanding the architecture, functionality, and vulnerabilities of these components is essential to appreciate the significance of the present invention.

Programmable Logic Controllers (PLCs) and Supervisory Control and Data Acquisition (SCADA) systems are fundamental technologies in modern industrial automation and control. PLCs serve as the backbone of industrial process control, acting as rugged, reliable computers designed to withstand harsh industrial environments. These devices bridge the gap between the digital world of control systems and the physical realm of industrial machinery. PLCs are characterized by their modular design, allowing for flexible configuration and easy maintenance. They excel in real-time processing, continuously scanning inputs, executing control logic, and updating outputs within milliseconds. This deterministic behavior ensures consistent and predictable response times, facilitating maintaining precise control over industrial processes. PLCs support a wide range of input and output types, enabling them to interface with various sensors and actuators. Traditionally programmed using ladder logic, a graphical language resembling electrical circuit diagrams, PLCs are accessible to electricians and control engineers. Their non-volatile memory ensures that control programs and configuration data persist even during power interruptions, allowing for seamless resumption of operations.

SCADA systems, on the other hand, represent the broader control and monitoring infrastructure in industrial settings. These systems provide a centralized platform for operators to supervise, control, and optimize industrial processes across geographically dispersed locations. At the heart of SCADA systems is the Human-Machine Interface (HMI), which serves as the primary point of interaction between operators and the control system. SCADA systems incorporate supervisory computers, Remote Terminal Units (RTUs), and PLCs to create a comprehensive control ecosystem. They rely on robust communication infrastructure to facilitate data exchange between field devices and the central control system. SCADA systems also typically include historian databases for long-term data storage and trend analysis, as well as alarm management systems to detect and notify operators of abnormal conditions. By integrating these various components, SCADA systems enable efficient monitoring, control, and optimization of complex industrial processes, enhancing productivity and safety in industrial environments.

SCADA and PLC systems, while facilitating in managing industrial processes, have historically prioritized reliability and functionality over security. This approach, combined with the increasing connectivity of industrial systems to corporate networks and the internet, has exposed these systems to a wide array of cybersecurity threats. Many legacy SCADA protocols lack built-in authentication mechanisms and transmit data in clear text, making them vulnerable to eavesdropping and man-in-the-middle attacks. Remote access capabilities, though useful for maintenance and troubleshooting, often rely on weak authentication methods or default credentials, providing potential entry points for attackers. The long operational lifespan of industrial equipment and the critical nature of their operations frequently result in systems running outdated software with known vulnerabilities, and patching these systems can be challenging due to concerns about system stability and downtime.

Insufficient separation between corporate IT networks and industrial control networks can allow attackers to compromise critical industrial assets. Many PLCs lack secure boot processes or cryptographic verification of firmware updates, potentially allowing attackers to upload malicious firmware. Limited logging and monitoring capabilities in many industrial control systems make it difficult to detect and investigate security incidents. PLCs and other industrial control devices are often sensitive to network flooding and other forms of denial-of-service attacks, which can disrupt critical processes. These systems often lack robust input validation mechanisms, making them susceptible to buffer overflow attacks and other forms of code injection. Some industrial control devices contain hardcoded passwords or backdoor accounts, which can be exploited if discovered by attackers. Additionally, the ladder logic programs running on PLCs can contain vulnerabilities or logic flaws that may be exploited to manipulate industrial processes. These vulnerabilities collectively underscore the need for a more comprehensive approach to security in industrial control systems.

Existing approaches for analyzing and preventing attacks on SCADA and PLC systems encompass a wide range of strategies. These include network-based and host-based intrusion detection systems, which monitor for suspicious activities in network traffic and on individual devices respectively. Physical process anomaly detection employs machine learning to identify deviations from normal operational patterns. Network security measures such as firewalls and segmentation aim to isolate critical systems, while secure communication protocols address vulnerabilities in legacy industrial protocols. Regular vulnerability assessments, patch management, and strong access control mechanisms form part of ongoing security maintenance. Secure coding practices and formal verification of control logic seek to reduce vulnerabilities at the development stage.

Despite these varied approaches, significant limitations persist in the security of industrial control systems. Many solutions are reactive rather than proactive, often lacking context awareness of the specific industrial processes they protect. Performance impacts can be problematic in time-critical industrial settings, and updating legacy systems presents significant challenges. Protection against insider threats and zero-day vulnerabilities remains inadequate. The scalability of some security measures, such as formal verification, becomes increasingly difficult as system complexity grows. Many solutions fail to effectively integrate cybersecurity with the semantics of physical processes, and forensic capabilities are often insufficient for thorough post-incident analysis. Furthermore, the adaptability of current security solutions to evolving threats and changing industrial requirements is limited. These limitations underscore the need for a more comprehensive and proactive approach to securing SCADA and PLC systems, which the present invention aims to address through its novel method of implementing Secure Write operations.

This background information is provided to reveal information believed by the applicant to be of possible relevance to the present invention. No admission is necessarily intended, nor should be construed that any of the preceding information constitutes prior art against the present invention.

SUMMARY OF THE INVENTION

With the above in mind, embodiments of the present invention are directed to a system and associated methods for securing Supervisory Control and Data Acquisition (SCADA) and Industrial Control Systems (ICS) through Secure Write operations, that utilize the following techniques:

1. Predefined Input Validation: Secure Write operations are only valid with a predefined set of inputs, ensuring that PLCs operate within their intended range and preventing attacks that manipulate operational parameters.

2. Instruction Decoder at PLC Level: A specialized decoder is implemented within the PLC to verify Secure Write instructions. This decoder only processes commands that conform to an approved set of inputs, adding an extra layer of security at the device level.

3. Macro-based Execution: Secure Write operations can optionally use pre-defined and approved macros, allowing for easy detection of any variations or unauthorized modifications at the PLC level.

4. Protected Reprogramming Process: Implementing new Secure Write features requires a system-mode set of operations that modify boot code. This process is secured through a chain of authentication keys, ensuring that only authorized changes can be made to the PLC's core functionality.

5. Local Secure Memory Utilization: When processing a Secure Write instruction, the PLC's decoder uses a local secure memory to extract permitted operations. This memory contains pre-arranged instructions agreed upon by both the SCADA software and the PLC.

6. Dynamic Reconfiguration: The local secure memory can be reconfigured at boot time, allowing for secure updates to the approved Secure Write instructions without compromising system integrity.

6. Enhanced Protection Against Known Vulnerabilities: By implementing Secure Write, the system becomes more resilient to common PLC attack vectors such as custom firmware uploads, unauthorized ladder logic modifications, and basic fuzzing attacks.

7. Resource Exhaustion Mitigation: The predefined nature of Secure Write operations helps prevent resource exhaustion attacks by limiting the scope of possible commands.

8. Mitigation of Undocumented Functionality Exploits: By restricting operations to pre-approved commands, Secure Write reduces the risk of attackers exploiting undocumented or hidden functionality in PLCs.

9. Seamless Integration with Existing SCADA Systems: Secure Write can be implemented as a modification to existing Write instructions, allowing for easier adoption in current industrial control environments without requiring a complete system overhaul.

Embodiments of the present invention are directed to a system and associated methods for securing SCADA and Industrial Control Systems through Secure Write operations. The invention addresses critical vulnerabilities in industrial control environments by implementing a multi-layered security approach that governs the generation, transmission, and execution of control commands between SCADA systems and PLCs.

In one embodiment, the present invention comprises a Secure Write Module integrated within the SCADA software. This module is configured to generate Secure Write instructions based on predefined, approved operations, encoding these instructions in a secure format resistant to tampering or unauthorized modification.

Another embodiment of the invention involves enhancing the PLC with advanced security features. These enhancements include an Instruction Decoder, a Local Secure Memory, and an Instruction Validator. The Instruction Decoder is configured to receive and verify the integrity of Secure Write instructions. The Local Secure Memory stores a list of approved operations and their permitted parameters, while the Instruction Validator ensures that only pre-approved, safe operations are executed on the PLC.

Another embodiment of the invention provides a method for secure reprogramming of the PLC. This method involves a separate authentication process using a chain of cryptographic keys, allowing for secure modifications to the boot code and updates to the Local Secure Memory when the system is not in normal operation mode.

Another embodiment of the invention introduces a Secure Memory Initialization Protocol (SMIP) for the PLC. This protocol utilizes a multi-stage secure boot process, incorporating a hardware-based root of trust and multiple layers of authentication to ensure the integrity and authenticity of the PLC's local secure memory contents.

The invention also encompasses a method for processing Secure Write instructions. This method includes steps for instruction generation at the SCADA level, secure transmission to the PLC, multi-layer validation at the PLC level, and either execution of valid instructions or secure handling and logging of rejected instructions.

Embodiments of the present invention provide significant advancements in industrial control system security. By implementing robust security measures at both the SCADA and PLC levels, the invention offers comprehensive protection against unauthorized commands, custom firmware uploads, and exploitation of undocumented functionality, while maintaining operational efficiency of the industrial control system.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled people having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
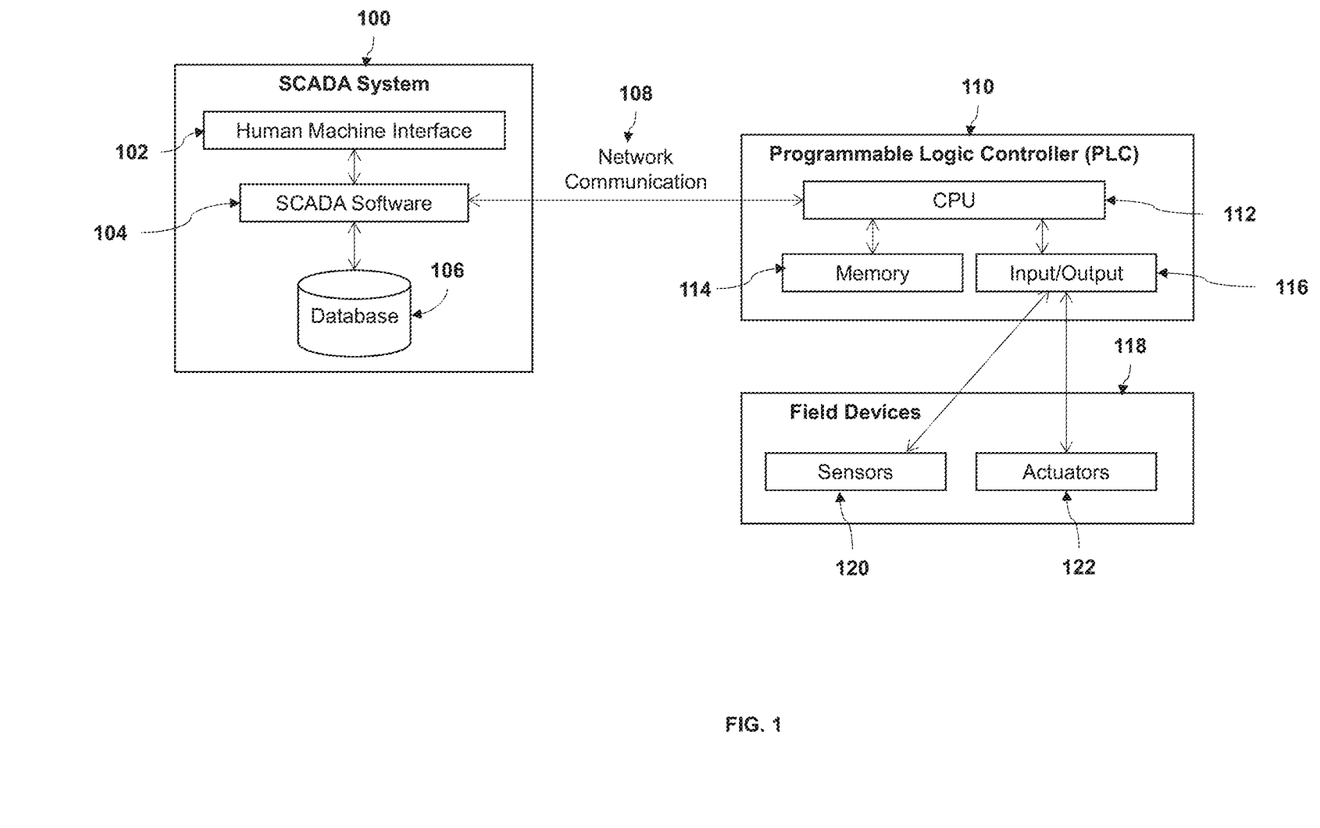
FIG. 1 is an illustration of SCADA and PLC systems and their interactions, according to an embodiment of the present invention.

Referring now to FIG. 1, an illustration of SCADA and PLC systems and their interactions, is described in more detail. The figure illustrates the interaction between a Supervisory Control and Data Acquisition (SCADA) system and a Programmable Logic Controller (PLC) in an Industrial Control System (ICS) environment. The system comprises three main components: the SCADA system 100, the PLC 110, and the field devices 118. The SCADA system 100 comprises three key elements: Human Machine Interface (HMI) 102, SCADA software 104, and Database 106. The Human Machine Interface (HMI) 102 serves as the primary point of interaction for operators, offering a graphical interface for process monitoring and control. The HMI 102 maintains a direct, bidirectional communication channel with the SCADA software 104, facilitating real-time information display and control input. The SCADA software 104 itself functions as the brain the system, processing data, managing operations, and orchestrating communication across various system components. It interfaces with the HMI 102 for information exchange, interacts with the database 106 for data storage and retrieval, and establishes network connections with the PLC's Central Processing Unit (CPU) 112 to exchange data and control commands. Complementing these components is the database 106, which serves as a repository for historical data, system configurations, and other pertinent information, maintaining a continuous data exchange with the SCADA software 104 for logging and retrieval purposes.

The Programmable Logic Controller (PLC) 110 represents another element in this ecosystem. At its core is the CPU 112, which executes control logic and manages PLC operations. The CPU 112 maintains communication with the SCADA software 104 over a network connection 108, interacts with the PLC's memory 114 for program and data management, and oversees the I/O modules 116 that interface with field devices 118. The PLC's memory 114 stores the operational program, data, and temporary variables, engaging in constant data exchange with the CPU 112 to facilitate program execution and data management. The Input/Output (I/O) modules 116 serve as the bridge between the PLC 110 and field devices 118, handling signal conversion and isolation. These modules communicate with the CPU 112 to exchange data from and to field devices 118, while also maintaining direct connections with sensors 120 for data acquisition and actuators 122 for control implementation.

Field devices 118 represent the physical interface between the control system and the industrial process. Sensors 120 collect data from the physical environment, such as temperature, pressure, or flow rate, and transmit this information to the PLC's I/O modules 116 for processing by both the PLC 110 and SCADA system 100. Actuators 122, on the other hand, implement changes in the physical environment based on control commands. These devices, which may include valves, motors, or switches, receive control signals from the PLC's I/O modules 116 to perform actions within the industrial process.

The interaction flow within this system follows a cyclical pattern. Operators input control commands through the HMI 102, which the SCADA software 104 processes and transmits to the PLC's CPU 112 over the network. The PLC's CPU 112 processes these commands, updates its memory 114, and sends appropriate signals to the I/O modules 116. These modules convert the signals and relay them to the relevant actuators 122 in the field. Simultaneously, sensors 120 in the field continuously collect data, which is sent back through the I/O modules 116 to the PLC's CPU 112, and subsequently returned to the SCADA system 100. The SCADA software 104 receives process data from the PLC via network communication. This data undergoes processing, storage in the database, and display on the HMI 102 for operator monitoring, thus completing the control loop. This continuous cycle of control, data acquisition, processing, and feedback forms the core of the SCADA-PLC interaction in industrial control systems, enabling efficient and responsive management of complex industrial processes.

Figure 2:
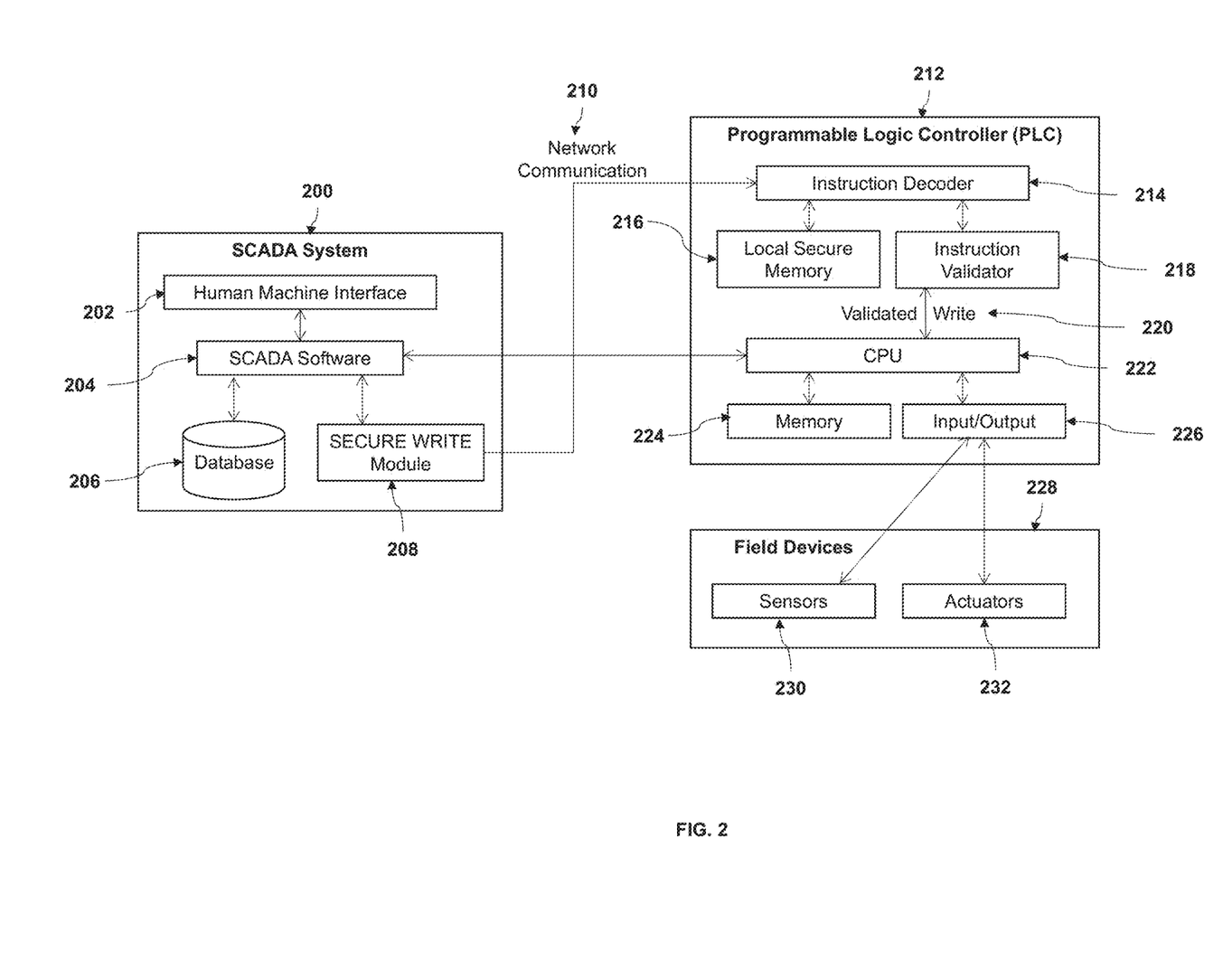
FIG. 2 is an illustration of Secure Write operations within SCADA and PLC systems, according to an embodiment of the invention.

Referring now to FIG. 2, an illustration of Secure Write operations within SCADA and PLC systems, is described in more detail. The proposed Secure Write system is designed to enhance the security of Supervisory Control and Data Acquisition (SCADA) systems and their interactions with Programmable Logic Controllers (PLCs) in Industrial Control System (ICS) environments. In the context of the present invention, the Secure Write system introduces a novel approach to validating and executing write operations, significantly reducing the risk of unauthorized or malicious commands being executed on PLCs. The SCADA system 200 is the central control and monitoring platform in an industrial environment. It includes: Human Machine Interface (HMI) 202 for operator interaction, SCADA software 204 for processing data and managing system operations, and Database 206 for storing historical data and system configurations. Within the SCADA system, a novel component—Secure Write Module 208 is introduced. The Secure Write Module 208 is configured to generate Secure Write instructions based on operator inputs or automated processes. It encodes the said instructions in a secure format resistant to tampering. The Secure Write Module maintains a set of predefined macros that represent approved operations, ensuring that only known, safe commands can be transmitted to the PLC. These instructions are not mere data packets but are encoded in a secure format designed to resist tampering and unauthorized modification. This approach significantly reduces the attack surface by limiting the range of possible operations to a pre-approved set.

The PLC 212 is enhanced with additional security features including an Instruction Decoder 214, Local Secure Memory 216, and Instruction Validator 218. The Instruction Decoder 214 is configured to receive Secure Write instructions from the SCADA system 200, verify the format and integrity of received instructions and decode said instructions for further processing. The Local Secure Memory 216 comprises a list of approved operations and their permitted parameters, cryptographic keys and, configuration data set during a secure boot process to ensure integrity. The Instruction Validator 218 is configured to check if decoded operations are within the set of approved operations and validate operation parameters against permitted ranges or values. The Instruction Validator 218 ensures execution of only pre-approved, safe operations on the PLC.

When a write operation is initiated from the SCADA system 200, whether through operator input or an automated process, it is first processed by the Secure Write Module 208. This module encodes the operation as a Secure Write instruction, applying security measures that protect the integrity and confidentiality of the command. The encoded instruction is then transmitted to the PLC over the existing communication infrastructure 210. Upon receiving the Secure Write instruction, the PLC's Instruction Decoder 214 immediately begins its validation process. It first checks the format and integrity of the instruction, ensuring that it has not been altered during transmission and that it conforms to the expected secure format. If this initial check is passed, the Instruction Decoder 214 proceeds to decode the instruction, extracting the operation and its parameters. The decoded instruction is then passed to the Instruction Validator 218, which performs a series of critical checks. First, it verifies that the operation itself is present in the list of approved operations stored in the Local Secure Memory 216. This check ensures that only pre-approved operations can be executed, preventing the introduction of potentially malicious or unauthorized commands. Next, the Instruction Validator 218 checks the parameters of the operation against the permitted ranges or values also stored in the Local Secure Memory 216. This step prevents approved operations from being used in ways that could potentially harm the system or the industrial process it controls. If both the operation and its parameters are approved, the instruction is finally executed on the PLC, affecting the industrial process as intended. However, if at any point in this multi-layered validation process a check fails—whether due to an integrity issue, an unauthorized operation, or out-of-range parameters—the instruction is immediately rejected. In such cases, the system logs the error for later analysis and sends a notification back to the SCADA system, alerting operators or system administrators to the potential security event.

This multi-layered validation process, combined with the use of predefined, approved operations, significantly enhances the security of SCADA-PLC communication. It provides robust protection against a wide range of potential attacks, including unauthorized commands, custom firmware uploads, and attempts to exploit undocumented functionality. Importantly, the Secure Write system achieves this enhanced security while maintaining the operational efficiency of the industrial control system, ensuring that legitimate operations can be executed without undue delay.

Figure 3:
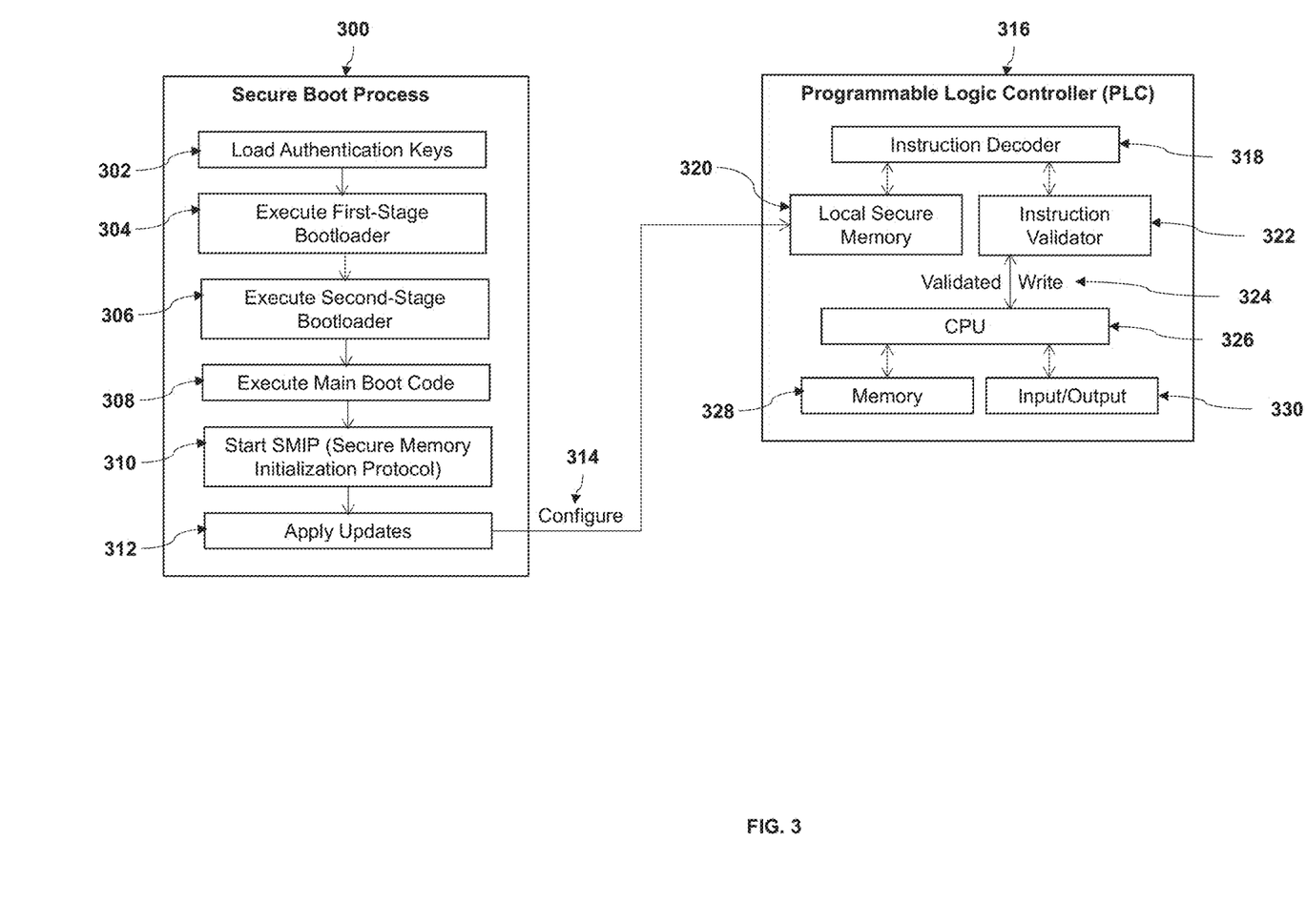
FIG. 3 is an illustration of secure programming process of the local secure memory of the PLC, according to an embodiment of the invention.

Referring now to FIG. 3, an illustration of secure programming process of the local secure memory of the PLC, is described in more detail. The present invention incorporates a novel secure programming process for the Local Secure Memory 320 of the Programmable Logic Controller (PLC) 316, hereinafter referred to as the Secure Memory Initialization Protocol (SMIP). The SMIP utilizes a multi-stage secure boot process to ensure the integrity and authenticity of the local secure memory 320 contents. Initially, the PLC 316 engages a hardware-based root of trust, typically implemented as a secure cryptographic chip, which stores a set of immutable authentication keys 302. These keys are used to verify the integrity of the first-stage bootloader 304, which is stored in read-only memory (ROM). Upon successful verification, the first-stage bootloader decrypts and authenticates the second-stage bootloader 306, which is stored in rewritable non-volatile memory. This second-stage bootloader, in turn, verifies and loads the main boot code 308. The main boot code then initiates the configuration of the local secure memory 320, following the Secure Memory Initialization Protocol (SMIP) 310, a process which involves several security measures. First, it verifies the current contents of the local secure memory 320 against a secure hash stored in a tamper-resistant area of the PLC 316. If the verification fails, indicating potential tampering, the boot code initiates a secure recovery process, loading a known-good configuration from a secure backup. If verification succeeds, or after recovery, the boot code 308 proceeds to update the local secure memory 320 with any new approved operations or security parameters. Finally, the boot code 308 computes and stores a new secure hash of the updated local secure memory 320 contents. This comprehensive secure programming process ensures that the local secure memory 320 of the PLC contains only authenticated, approved operations and security parameters, thereby forming a component of the overall security architecture of the Secure Write system.

Figure 4:
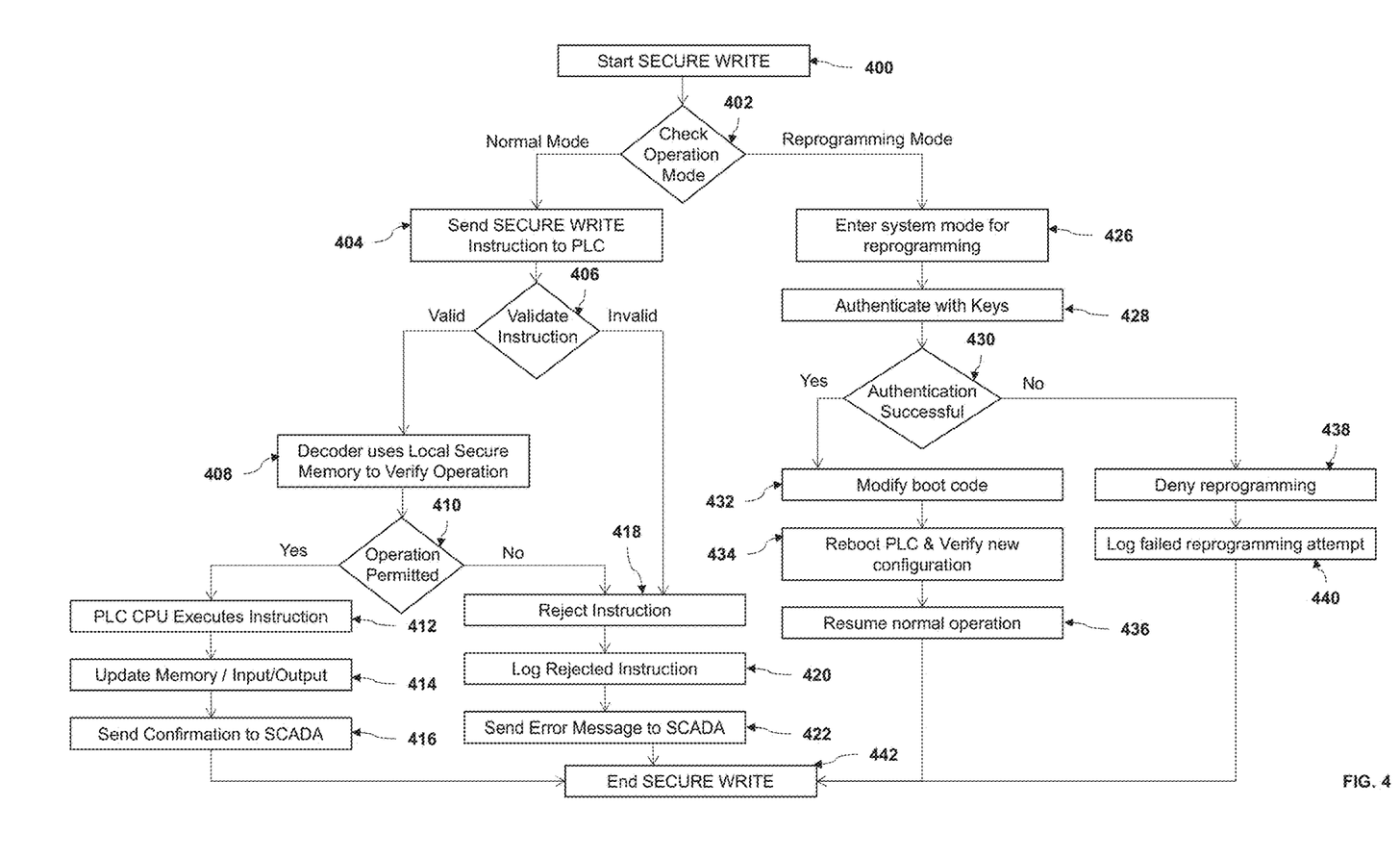
FIG. 4 is an illustration of the steps involved in a Secure write operation, according to an embodiment of the invention.

Referring now to FIG. 4, an illustration of the steps involved in a Secure write operation, is described in more detail. The Secure Write system operates through a series of precisely defined steps to ensure the security and integrity of write operations in industrial control systems. The Secure Write operation initiates at step 400 and continues with checking of the system's operational mode at step 402. If the system is in normal operation mode, the SCADA system initiates a Secure Write operation. This operation begins with the SCADA software selecting a predefined macro, which is then used to generate a Secure Write instruction. This instruction is subsequently transmitted to the Programmable Logic Controller (PLC) at step 404. Upon receipt of the instruction, the PLC's Instruction Decoder performs a validation step 406. If the instruction is valid, the Instruction Decoder proceeds to utilize the Local Secure Memory to verify the operation's permissibility 408. If the instruction fails the initial validation, it is immediately rejected 418. Similarly, if the operation is not found to be permitted based on the Local Secure Memory's contents, the instruction is also rejected 418. In either case of rejection, the system logs the rejected instruction at step 420 and sends an error message back to the SCADA system at step 422.

If both validation steps are successful, the PLC's CPU executes the instruction at step 412. This execution may involve updating the PLC's memory or I/O as may be beneficial by the instruction at step 414. Following successful execution, a confirmation message is sent back to the SCADA system at step 416, signaling the completion of the Secure Write operation.

The system also incorporates a separate flow for reprogramming at step 426, which is initiated when the system is not in normal operation mode. This reprogramming process begins with an authentication step 428 utilizing a chain of keys. If authentication is successful, the system proceeds to modify the boot code at step 432 and update the Local Secure Memory. These changes are followed by a reboot of the PLC and a verification of the new configuration at step 434 before resuming normal operation at step 436. In the event of an authentication failure, the system denies the reprogramming attempt at step 438 and logs the failure at step 440.

This comprehensive process ensures that only authenticated, pre-approved operations can be executed on the PLC, significantly enhancing the security of the industrial control system. The multi-layered validation approach, coupled with the secure reprogramming process, provides robust protection against unauthorized commands and potential cyber threats while maintaining operational efficiency.

Throughout the application, reference may be made to various computer hardware, including servers, PLCs, CPUs, GPUs, storage, cloud storage, and the like. It is contemplated and included within the scope of the invention that the Secure Write system and its various components may be software executed on computer devices, including servers, PLCs, computers, IoT devices, and the like, each comprising a processor configured to execute commands received from software (such as microprocessors, field-programmable gate arrays, integrated circuits, and the like), a non-transitory computer-readable storage medium positioned in electrical communication with the processor and operable to store software and other digital information thereupon in one or both of transitory and non-transitory status (such as hard disk drives, solid state drives, flash drives, compact flash drives, SD drives, memory, and the like), and a network communication device operable to communicate across computer networks as are known in the art, including, but not limited to, wide area networks such as the Internet and mobile data networks, local area networks such as Ethernet and Wi-Fi networks, and personal area networks such as Bluetooth networks. Accordingly, it is contemplated and included within the scope of the invention that the computer hardware performing the above-described Secure Write functions includes hardware necessary for such performance as is known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

What is claimed is:

1. A method of performing secure write operations comprising:
    receiving a secure write instruction at a programmable-logic controller (PLC);
    performing a validation operation on the secure write instruction at the PLC;
    rejecting the secure write instruction responsive to determining the secure write instruction is invalid; and
    responsive to determining the secure write instruction is valid:
        verifying a permissibility of the secure write instruction at the PLC by comparing one or more parameters of the secure write instruction to a range of permitted values stored in the PLC;
        rejecting the secure write instruction responsive to determining the secure write instruction is impermissible; and
    executing the secure write instruction at the PLC responsive to determining the secure write instruction is permissible.

2. The method of claim 1 wherein the range of permitted values is stored on a local secure memory storage medium comprised by the PLC.

3. The method of claim 1 wherein executing the secure write instruction comprises updating at least one of a memory of the PLC, an input of the PLC, or an output of the PLC.

4. The method of claim 1 further comprising decoding the secure write instruction at the PLC.

5. The method of claim 1 further comprising:
identifying an operation mode of the PLC at a supervisory control and data acquisition (SCADA) system;
responsive to identifying the operation mode as a reprogramming mode:
performing an authentication process at the PLC;
responsive to successful completion of the authentication process:
modifying a boot code of the PLC to produce a modified boot code;
rebooting the PLC;
verifying the modified boot code; and
putting the PLC in a normal operation mode; and
preventing reprogramming of the PLC responsive to failing the authentication process; and
transmitting the secure write instruction to the PLC responsive to identifying the operation mode as a normal modem.

6. The method of claim 5 further comprising, responsive to executing the secure write instruction at the PLC, transmitting a confirmation to the SCADA of execution of the secure write instruction.

7. The method of claim 5 wherein performing the authentication process at the PLC comprises:
verifying an integrity of a first-stage bootloader using one or more hardware-encoded authentication keys;
decrypting and authenticating a second-stage bootloader by the first-stage bootloader;
verifying and loading a main boot code by the second-stage bootloader; and
initiating configuration of a local secure memory by the main boot code, the configuration comprising:
verifying a current content of the local secure memory against a secure hash stored in a tamper-resistant storage of the PLC;
initiating a secure recovery process responsive to failing to verify the current content of the local secure memory; and
responsive to at least one of verifying the current content of the local secure memory or completing the secure recovery process:
computing and storing a new secure hash in the tamper-resistant storage.

8. The method of claim 6 further comprising:
responsive to determining the secure write instruction is invalid;
logging the rejection of the secure write instruction; and
transmitting an error message to the SCADA; and
responsive to determining the secure write instruction is impermissible:
logging the rejection of the secure write instruction; and
transmitting an error message to the SCADA.

9. A system for performing secure write operations comprising:
a programmable-logic controller (PLC) comprising:
a processor;
a non-transitory computer-readable storage medium having software stored thereon that, when executed by the processor, is operable to:
send and receive communication with a supervisory control and data acquisition (SCADA) system; and
interact with one or more I/O modules comprised by the PLC that interface with one or more field devices;
an instruction decoder configured to perform a validation operation on the secure write instruction prior to execution of the secure write instruction; and
an instruction validator configured to verify a permissibility of the secure write instruction at the PLC prior to execution of the secure write instruction by comparing one or more parameters of the secure write instruction to a range of permitted values stored in the PLC.

10. The system of claim 9 wherein:
the PLC further comprises a local secure memory; and
the range of permitted values is stored on a local secure memory storage medium comprised by the PLC.

11. A system for performing secure write operations comprising:
means for receiving a secure write instruction at a programmable-logic controller (PLC);
means for performing a validation operation on the secure write instruction at the PLC; and
means for:
rejecting the secure write instruction responsive to determining the secure write instruction is invalid; and
responsive to determining the secure write instruction is valid:
verifying a permissibility of the secure write instruction at the PLC by comparing one or more parameters of the secure write instruction to a range of permitted values stored in the PLC;
rejecting the secure write instruction responsive to determining the secure write instruction is impermissible; and
executing the secure write instruction at the PLC responsive to determining the secure write instruction is permissible.

12. The system of claim 11 wherein the range of permitted values is stored on a local secure memory storage medium comprised by the PLC.

13. The system of claim 11 wherein executing the secure write instruction comprises updating at least one of a memory of the PLC, an input of the PLC, or an output of the PLC.

14. The system of claim 11 further comprising means for decoding the secure write instruction at the PLC.

15. The system of claim 11 further comprising:
means for identifying an operation mode of the PLC at a supervisory control and data acquisition (SCADA) system;
means for, responsive to identifying the operation mode as a reprogramming mode:
performing an authentication process at the PLC;
responsive to successful completion of the authentication process:
modifying a boot code of the PLC to produce a modified boot code;
rebooting the PLC;
verifying the modified boot code; and
putting the PLC in a normal operation mode; and
preventing reprogramming of the PLC responsive to failing the authentication process; and means for transmitting the secure write instruction to the PLC responsive to identifying the operation mode as a normal modem.

16. The system of claim 15 further comprising means for, responsive to executing the secure write instruction at the PLC, transmitting a confirmation to the SCADA of execution of the secure write instruction.

17. The system of claim 15 wherein the means for performing the authentication process at the PLC are further operable for:
   verifying an integrity of a first-stage bootloader using one or more hardware-encoded authentication keys;
   decrypting and authenticating a second-stage bootloader by the first-stage bootloader;
   verifying and loading a main boot code by the second-stage bootloader; and
   initiating configuration of a local secure memory by the main boot code, the configuration comprising:
      verifying a current content of the local secure memory against a secure hash stored in a tamper-resistant storage of the PLC;
      initiating a secure recovery process responsive to failing to verify the current content of the local secure memory; and
      responsive to at least one of verifying the current content of the local secure memory or completing the secure recovery process:
         computing and storing a new secure hash in the tamper-resistant storage.

18. The system of claim 17 further comprising:
   means for, responsive to determining the secure write instruction is invalid;
      logging the rejection of the secure write instruction; and
      transmitting an error message to the SCADA; and
   means for, responsive to determining the secure write instruction is impermissible:
      logging the rejection of the secure write instruction; and
      transmitting an error message to the SCADA.

* * * * *